(12) United States Patent
Yanev et al.

(10) Patent No.: US 9,229,476 B2
(45) Date of Patent: Jan. 5, 2016

(54) PERSONAL HANDHELD ELECTRONIC DEVICE WITH A TOUCHSCREEN ON A PERIPHERAL SURFACE

(71) Applicant: EZ AS A DRINK PRODUCTIONS, INC., Venice, CA (US)

(72) Inventors: Kostadin Dimitrov Yanev, Alamo, CA (US); Ivo Kostadinov Yanev, Sofia (BG); Angel Georgiev Vassilev, Sofia (BG)

(73) Assignee: EZ AS A DRINK PRODUCTIONS, INC., Reno, NV (US)

( * ) Notice: Subject to any disclaimer, the term of this patent is extended or adjusted under 35 U.S.C. 154(b) by 102 days.

(21) Appl. No.: 13/890,149

(22) Filed: May 8, 2013

(65) Prior Publication Data

US 2014/0333543 A1 Nov. 13, 2014

(51) Int. Cl.
*G06F 3/041* (2006.01)
*G06F 3/045* (2006.01)
*G06F 1/16* (2006.01)

(52) U.S. Cl.
CPC .............. *G06F 1/1622* (2013.01); *G06F 1/165* (2013.01); *G06F 1/1624* (2013.01); *G06F 1/1626* (2013.01); *G06F 1/1692* (2013.01)

(58) Field of Classification Search
CPC ... G06F 3/0488; G06F 3/041; G06F 3/04883; G06F 3/0416; G06F 3/0481; G06F 1/1647; G06F 15/16; G06F 17/30277; G06F 3/048; H04L 51/10
See application file for complete search history.

(56) References Cited

U.S. PATENT DOCUMENTS

| | | | |
|---|---|---|---|
| 4,577,625 A | 3/1986 | Lohati et al. | 128/57 |
| 4,702,108 A | 10/1987 | Amundsen | |
| 4,824,103 A | 4/1989 | Smidt | 272/125 |
| 4,988,981 A | 1/1991 | Zimmerman | |

(Continued)

FOREIGN PATENT DOCUMENTS

| | | |
|---|---|---|
| CN | 201270095 | 8/2009 |
| EP | 2 284 646 | 2/2011 |

(Continued)

OTHER PUBLICATIONS

"Fitness Made Fun", WiiFit, Instruction Booklet, copyright 2008 Nintendo, 28 pages.

(Continued)

*Primary Examiner* — Alexander Eisen
*Assistant Examiner* — Nan-Ying Yang
(74) *Attorney, Agent, or Firm* — Pillsbury Winthrop Shaw Pittman, LLP (57) ABSTRACT

This disclosure relates to a personal handheld electronic device with a touchscreen on a peripheral surface. In some implementations, the device may comprise one or more of a primary interface, a touchscreen, a processor, one or more information collection systems, electronic storage, a power supply, and/or other components. One or more components of the device may be disposed in or on a first housing body. In some implementations, one or more components of the device may be disposed in or on one or more housing bodies. The device may be configured such that the touchscreen is disposed on a peripheral surface of a housing body. The touchscreen being disposed on a peripheral surface may enable the device to receive information from a user and/or display information to the user when the device is in an open configuration and/or in a closed configuration.

19 Claims, 6 Drawing Sheets

(56) References Cited

U.S. PATENT DOCUMENTS

| | | | |
|---|---|---|---|
| 5,144,284 A | 9/1992 | Hammett | |
| 5,242,348 A | 9/1993 | Bates | 482/105 |
| 5,471,405 A | 11/1995 | Marsh | 364/556 |
| 5,702,323 A | 12/1997 | Poulton | |
| 5,720,711 A | 2/1998 | Bond et al. | 601/23 |
| 5,790,102 A | 8/1998 | Nassimi | 345/163 |
| 5,792,080 A | 8/1998 | Ookawa et al. | 601/115 |
| 5,890,995 A | 4/1999 | Bobick et al. | 482/4 |
| 5,904,639 A | 5/1999 | Smyser et al. | 482/91 |
| 5,923,318 A | 7/1999 | Zhai | |
| 5,982,342 A | 11/1999 | Iwata | |
| 5,997,489 A | 12/1999 | Iwamoto et al. | 601/73 |
| 6,013,007 A | 1/2000 | Root et al. | 482/8 |
| 6,063,045 A | 5/2000 | Wax | |
| 6,126,572 A | 10/2000 | Smith | 482/4 |
| 6,183,425 B1 | 2/2001 | Whalen et al. | 600/592 |
| 6,191,773 B1 | 2/2001 | Maruno | |
| 6,222,465 B1 | 4/2001 | Kumar | |
| 6,227,968 B1 | 5/2001 | Suzuki et al. | 463/7 |
| 6,324,557 B1 | 11/2001 | Chan | 708/142 |
| 6,359,611 B2 | 3/2002 | Chan | 345/156 |
| 6,360,597 B1 | 3/2002 | Hubbard, Jr. | 73/172 |
| 6,405,278 B1 | 6/2002 | Liepe | 711/103 |
| 6,435,937 B1 | 8/2002 | Naegele | 446/298 |
| 6,513,532 B2 | 2/2003 | Mault et al. | 128/921 |
| 6,585,668 B2 | 7/2003 | Nissim | |
| 6,595,901 B2 | 7/2003 | Reinbold et al. | 482/91 |
| 6,597,347 B1 | 7/2003 | Yasutake | |
| 6,605,038 B1 | 8/2003 | Teller et al. | 600/300 |
| 6,616,579 B1 | 9/2003 | Reinbold et al. | 482/91 |
| 6,662,651 B1 | 12/2003 | Roth | 73/379.02 |
| 6,675,130 B2 | 1/2004 | Kanevsky et al. | 702/188 |
| 6,776,345 B1 | 8/2004 | Liang | 235/486 |
| 6,807,869 B2 | 10/2004 | Farringdon et al. | 73/862.046 |
| 6,837,827 B1 | 1/2005 | Lee et al. | 482/8 |
| 6,914,695 B2 | 7/2005 | Walters et al. | 358/1.15 |
| 6,956,833 B1 | 10/2005 | Yukie et al. | 370/328 |
| 6,975,644 B2 | 12/2005 | Tordera et al. | 370/463 |
| 7,026,940 B2 | 4/2006 | Cherubini | |
| 7,121,982 B2 | 10/2006 | Feldman | |
| 7,161,490 B2 | 1/2007 | Huiban | |
| 7,169,120 B2 | 1/2007 | Murdock et al. | 601/129 |
| 7,192,387 B2 | 3/2007 | Mendel | 482/8 |
| 7,229,385 B2 | 6/2007 | Freeman et al. | 482/4 |
| 7,292,867 B2 | 11/2007 | Werner et al. | 455/456.3 |
| 7,303,534 B2 | 12/2007 | Kahn | 600/587 |
| 7,398,151 B1 | 7/2008 | Burrell et al. | 701/200 |
| 7,429,251 B2 | 9/2008 | Tanizawa et al. | 601/94 |
| 7,468,968 B2 | 12/2008 | Svensson et al. | 370/338 |
| 7,480,512 B2 | 1/2009 | Graham et al. | 455/456.3 |
| 7,499,746 B2 | 3/2009 | Buhlmann et al. | 607/2 |
| 7,517,327 B1 | 4/2009 | Knight | 601/46 |
| 7,526,314 B2 | 4/2009 | Kennedy | 455/556.1 |
| 7,526,954 B2 | 5/2009 | Haselhurst et al. | 73/172 |
| RE40,891 E | 9/2009 | Yasutake | |
| 7,643,895 B2 | 1/2010 | Gupta et al. | 700/94 |
| 7,666,118 B1 | 2/2010 | Anthony | |
| 7,699,755 B2 | 4/2010 | Feldman | |
| 7,699,757 B2 | 4/2010 | Clem et al. | 482/49 |
| 7,702,821 B2 | 4/2010 | Feinberg et al. | 710/13 |
| 7,717,825 B2 | 5/2010 | Van Der Hoeven | |
| 7,758,469 B2 | 7/2010 | Dyer et al. | 482/4 |
| 7,789,800 B1 | 9/2010 | Watterson et al. | 482/8 |
| 7,840,346 B2 | 11/2010 | Huhtala et al. | 701/209 |
| 7,909,741 B2 | 3/2011 | Kim | |
| 7,975,543 B2 | 7/2011 | Clem et al. | 73/379.02 |
| 8,009,056 B2 | 8/2011 | Greene | |
| 8,025,606 B2 | 9/2011 | Hamilton | |
| 8,027,822 B2 | 9/2011 | Turgiss et al. | 703/11 |
| 8,172,723 B1 | 5/2012 | Yanev et al. | 482/8 |
| 8,200,323 B2 | 6/2012 | DiBenedetto et al. | 600/519 |
| 8,203,454 B2 | 6/2012 | Knight | |
| 8,287,434 B2 | 10/2012 | Zavadsky | |
| 8,343,013 B1 | 1/2013 | Yanev et al. | 482/8 |
| 8,491,446 B2 | 7/2013 | Hinds | |
| 8,618,400 B2 | 12/2013 | Murphy | |
| 8,935,438 B1 | 1/2015 | Ivanchenko | |
| 2001/0049470 A1 | 12/2001 | Mault et al. | 600/300 |
| 2002/0146670 A1 | 10/2002 | Selles et al. | 434/247 |
| 2003/0020629 A1* | 1/2003 | Swartz et al. | 340/825.25 |
| 2003/0040688 A1 | 2/2003 | Bauer | 601/23 |
| 2003/0093012 A1 | 5/2003 | Smyser | |
| 2003/0137495 A1 | 7/2003 | Canova | |
| 2004/0021681 A1 | 2/2004 | Liao | 345/702 |
| 2004/0058305 A1 | 3/2004 | Lurie et al. | 434/265 |
| 2004/0110602 A1 | 6/2004 | Feldman | |
| 2004/0176226 A1 | 9/2004 | Carlson | |
| 2004/0260215 A1 | 12/2004 | Kim | 601/99 |
| 2005/0040999 A1* | 2/2005 | Numano | 345/1.1 |
| 2005/0130742 A1 | 6/2005 | Feldman | |
| 2005/0177054 A1 | 8/2005 | Yi | |
| 2005/0209049 A1 | 9/2005 | Shields | 482/8 |
| 2005/0219355 A1 | 10/2005 | Tahara et al. | 348/14.05 |
| 2005/0283204 A1 | 12/2005 | Buhlmann | |
| 2006/0035762 A1 | 2/2006 | Smyser et al. | 482/91 |
| 2006/0064042 A1 | 3/2006 | Smyser et al. | 600/595 |
| 2006/0100899 A1 | 5/2006 | Tajima | 705/2 |
| 2006/0122819 A1 | 6/2006 | Carmel | |
| 2006/0247095 A1 | 11/2006 | Rummerfield | 482/1 |
| 2007/0015589 A1 | 1/2007 | Shimizu | |
| 2007/0024736 A1* | 2/2007 | Matsuda et al. | 348/333.12 |
| 2007/0051842 A1 | 3/2007 | Pryor | 242/378.3 |
| 2007/0184953 A1 | 8/2007 | Luberski | |
| 2007/0219059 A1 | 9/2007 | Schwartz et al. | 482/8 |
| 2007/0219469 A1 | 9/2007 | Vardy | |
| 2007/0232455 A1 | 10/2007 | Hanoun | |
| 2007/0249975 A1 | 10/2007 | Pan et al. | 601/118 |
| 2007/0270727 A1 | 11/2007 | KhorassaniZadeh | |
| 2008/0090703 A1 | 4/2008 | Rosenberg | 492/8 |
| 2008/0091762 A1 | 4/2008 | Neuhauser et al. | 709/201 |
| 2008/0096726 A1 | 4/2008 | Riley et al. | 482/8 |
| 2008/0100718 A1 | 5/2008 | Louks et al. | 348/211.2 |
| 2008/0101272 A1 | 5/2008 | Hayes et al. | 370/313 |
| 2008/0132388 A1 | 6/2008 | Clem | |
| 2008/0146336 A1 | 6/2008 | Feldman et al. | 463/37 |
| 2008/0161051 A1 | 7/2008 | Schobbert et al. | 455/558 |
| 2008/0171311 A1 | 7/2008 | Centen | |
| 2008/0261696 A1 | 10/2008 | Yamazaki et al. | 463/39 |
| 2008/0262918 A1 | 10/2008 | Wiener | 705/14 |
| 2008/0281234 A1 | 11/2008 | Goris | |
| 2008/0287832 A1 | 11/2008 | Collins et al. | 600/587 |
| 2008/0300055 A1 | 12/2008 | Lutnick | |
| 2009/0017993 A1 | 1/2009 | Khanicheh et al. | 482/49 |
| 2009/0025475 A1 | 1/2009 | DeBeliso et al. | 73/379.02 |
| 2009/0035740 A1 | 2/2009 | Reed et al. | 434/265 |
| 2009/0048021 A1 | 2/2009 | Lian et al. | 463/37 |
| 2009/0048070 A1 | 2/2009 | Vincent et al. | 482/8 |
| 2009/0069160 A1 | 3/2009 | Summers | 482/91 |
| 2009/0076855 A1 | 3/2009 | McCord | 705/3 |
| 2009/0098980 A1 | 4/2009 | Waters | |
| 2009/0144080 A1 | 6/2009 | Gray et al. | 705/2 |
| 2009/0148821 A1 | 6/2009 | Carkner et al. | 434/265 |
| 2009/0228068 A1 | 9/2009 | Buhlmann et al. | 607/48 |
| 2009/0286654 A1 | 11/2009 | Rice | |
| 2010/0021876 A1 | 1/2010 | Clash | 434/265 |
| 2010/0056341 A1 | 3/2010 | Ellis et al. | 482/9 |
| 2010/0069148 A1 | 3/2010 | Cargill | 463/25 |
| 2010/0087763 A1 | 4/2010 | Hane-Karr | 601/137 |
| 2010/0127983 A1 | 5/2010 | Irani | |
| 2010/0137105 A1 | 6/2010 | McLaughlin | 482/8 |
| 2010/0178981 A1 | 7/2010 | Holcomb et al. | 463/37 |
| 2010/0197462 A1 | 8/2010 | Piane | |
| 2010/0245239 A1 | 9/2010 | Sternberg | |
| 2010/0248822 A1 | 9/2010 | Migos et al. | 463/29 |
| 2010/0255862 A1* | 10/2010 | Mitsunaga et al. | 455/466 |
| 2010/0255957 A1 | 10/2010 | Clem et al. | 482/49 |
| 2010/0259422 A1 | 10/2010 | Radivojevic | |
| 2010/0265179 A1 | 10/2010 | Ram | 345/163 |
| 2010/0273610 A1 | 10/2010 | Johnson | 482/9 |
| 2010/0292050 A1 | 11/2010 | DiBenedetto et al. | 482/9 |
| 2010/0292600 A1 | 11/2010 | DiBenedetto et al. | 600/520 |
| 2011/0035303 A1 | 2/2011 | Jakstadt et al. | 705/34 |
| 2011/0046687 A1 | 2/2011 | Naschberger | 607/3 |
| 2011/0086747 A1 | 4/2011 | Broderick | |

(56) References Cited

U.S. PATENT DOCUMENTS

| | | | |
|---|---|---|---|
| 2011/0124470 A1 | 5/2011 | Spurling et al. | 482/13 |
| 2011/0125866 A1 | 5/2011 | Williams | 709/217 |
| 2011/0143769 A1 | 6/2011 | Jones | |
| 2011/0165998 A1 | 7/2011 | Lau et al. | 482/8 |
| 2011/0187660 A1* | 8/2011 | Hirata et al. | 345/173 |
| 2011/0251021 A1 | 10/2011 | Zavadsky et al. | 482/5 |
| 2011/0260987 A1 | 10/2011 | Zhao et al. | 345/173 |
| 2011/0291943 A1 | 12/2011 | Thórn et al. | 345/173 |
| 2011/0302694 A1 | 12/2011 | Wang | |
| 2012/0047465 A1 | 2/2012 | Noda | |
| 2012/0051596 A1 | 3/2012 | Darnell | |
| 2012/0058861 A1 | 3/2012 | Satut | |
| 2012/0066591 A1* | 3/2012 | Hackwell | 715/702 |
| 2012/0071732 A1 | 3/2012 | Grey et al. | 600/301 |
| 2012/0075236 A1 | 3/2012 | Kim | |
| 2012/0077163 A1 | 3/2012 | SucarSuccar | |
| 2012/0078113 A1 | 3/2012 | Whitestone | |
| 2012/0088553 A1 | 4/2012 | Nunes | |
| 2012/0098744 A1 | 4/2012 | Stinson | |
| 2012/0108394 A1 | 5/2012 | Jones et al. | 482/8 |
| 2012/0112922 A1 | 5/2012 | Hillis et al. | 340/657 |
| 2012/0113019 A1* | 5/2012 | Anderson | 345/173 |
| 2012/0116550 A1 | 5/2012 | Hoffman et al. | 700/91 |
| 2012/0126941 A1 | 5/2012 | Coggill | 340/5.54 |
| 2012/0150074 A1 | 6/2012 | Yanev et al. | 600/587 |
| 2012/0162080 A1 | 6/2012 | Cao | 345/168 |
| 2012/0260220 A1 | 10/2012 | Griffin | |
| 2012/0265112 A1 | 10/2012 | Chen | 601/115 |
| 2012/0274508 A1 | 11/2012 | Brown | |
| 2012/0306782 A1 | 12/2012 | Seo et al. | 345/173 |
| 2013/0009907 A1 | 1/2013 | Rosenberg | |
| 2013/0059696 A1 | 3/2013 | Hijmans et al. | 482/8 |
| 2013/0072301 A1 | 3/2013 | Mallinson | |
| 2013/0076649 A1 | 3/2013 | Myers | |
| 2013/0093679 A1 | 4/2013 | Dickinson | |
| 2013/0106155 A1 | 5/2013 | Chang | |
| 2013/0127748 A1 | 5/2013 | Vertegaal | |
| 2013/0127980 A1 | 5/2013 | Haddick | |
| 2013/0201316 A1 | 8/2013 | Binder | |
| 2013/0212674 A1 | 8/2013 | Boger | |
| 2013/0337974 A1 | 12/2013 | Yanev et al. | 482/8 |
| 2013/0337975 A1 | 12/2013 | Yanev et al. | 482/8 |
| 2013/0337976 A1 | 12/2013 | Yanev et al. | 482/8 |
| 2013/0344919 A1 | 12/2013 | Kim | |
| 2013/0345608 A1 | 12/2013 | Ehrenreich | |
| 2014/0062682 A1 | 3/2014 | Birnbaum | |
| 2014/0123003 A1 | 5/2014 | Song | |
| 2014/0184496 A1 | 7/2014 | Gribetz | |
| 2014/0317722 A1 | 10/2014 | Tartz | |
| 2014/0335494 A1 | 11/2014 | Yanev et al. | 434/262 |
| 2015/0015476 A1 | 1/2015 | Yanev et al. | 345/156 |
| 2015/0173993 A1 | 6/2015 | Walsh | |

FOREIGN PATENT DOCUMENTS

| | | |
|---|---|---|
| JP | 2006345990 | 12/2006 |
| JP | 2009142333 | 7/2009 |
| JP | 2010524094 | 7/2010 |
| TW | 509566 | 1/1988 |
| TW | 201000175 A | 1/2010 |
| WO | WO 2007/025382 | 3/2007 |
| WO | WO 2012/078718 | 6/2012 |
| WO | WO 2013/192071 | 12/2013 |
| WO | WO 2013/192079 | 12/2013 |
| WO | WO 2013/192084 | 12/2013 |
| WO | 2014018049 | 1/2014 |
| WO | WO 2014/182729 | 11/2014 |
| WO | WO 2014/182735 | 11/2014 |
| WO | 2015006411 | 1/2015 |
| WO | 2015006413 | 1/2015 |

OTHER PUBLICATIONS

Jovanov et al., "A Wireless Body Area Network of Intelligent Motion Sensors for Computer Assisted Physical Rehabilitation", Journal of NeuroEngineering and Rehabilitation, Mar. 1, 2005, vol. 2, No. 6, retrieved from URL: http://www.jneuroengrehab.com/content/2/1/6, retrieved on Apr. 2, 2012, 10 pages.

"Halfbakery, "Computer Mouse with Pressure Sensitive Button", printed from http://www.halfbakery.com/idea/Computer_20Mouse_20with_20pressure...", Cord, May 10, 2005, printed Apr. 4, 2014, 3 pages.

International Search Report and Written Opinion mailed Apr. 20, 2012 for corresponding International Patent Application No. PCT/US2011/063678 (7 pages).

International Search Report and Written Opinion mailed Mar. 13, 2015 for corresponding International Patent Application No. PCT/US2014/037012, 9 pages.

International Search Report and Written Opinion mailed Mar. 4, 2015 for corresponding International Patent Application No. PCT/US2014/037018, 9 pages.

International Search Report and Written Opinion mailed Nov. 22, 2013 for corresponding International Patent Application No. PCT/US2013/046082 (7 pages).

International Search Report and Written Opinion mailed Nov. 7, 2014 for corresponding International Patent Application No. PCT/EPUS2014/045899 (7 pages).

International Search Report and Written Opinion mailed Oct. 1, 2013 for corresponding International Patent Application No. PCT/US2013/046096 (10 pages).

International Search Report and Written Opinion mailed Oct. 2, 2013 for corresponding International Patent Application No. PCT/US2013/046118 (10 pages).

\* cited by examiner

PERSONAL HANDHELD ELECTRONIC DEVICE WITH A TOUCHSCREEN ON A PERIPHERAL SURFACE

FIELD OF THE DISCLOSURE

This disclosure relates to a personal handheld electronic device with a touchscreen on a peripheral surface.

BACKGROUND OF THE DISCLOSURE

Touchscreens provided on mobile devices are known. Typical mobile devices provide one touchscreen for presenting information to and/or receiving information from the user. In some instances, a secondary display may be provided by the mobile device. In instances where the secondary display is provided, the secondary display may be configured only to present information. The secondary display may not be configured to receive information from the user.

SUMMARY

One aspect of the disclosure relates to a personal handheld electronic device, in accordance with one or more implementations. In some implementations, the device may comprise one or more of a primary interface, a touchscreen, a processor, one or more information collection systems, electronic storage, a power supply, and/or other components. One or more components of the device may be disposed in or on one or more housing bodies. The device may be configured such that the touchscreen is disposed on a peripheral surface of a first housing body and/or a second housing body. The touchscreen being disposed on a peripheral surface may enable the device to receive information from a user and/or display information to the user when the device is in an open configuration and/or in a closed configuration. The touchscreen being disposed on a peripheral surface may facilitate use of the non-peripheral surfaces and/or other surfaces of the device for other functionality. The one or more components of the device may be disposed partially or wholly within a housing body, or be disposed on an external surface of a housing body.

One or more implementations of the device may be generally shaped as a rectangular prism in certain configurations. In some implementations, the first housing body and/or the second housing body may be shaped as a rectangular prism.

In some implementations, the first housing body may have a first length, a first width, and a first thickness. In some implementations, the first length may be greater than the first width. The first width may be greater than the first thickness. In some implementations, the first housing body may include a first broad surface opposing a second broad surface. The first broad surface and the second broad surface may both be defined by the first length and the first width. The first housing body may include a first peripheral surface opposing a second peripheral surface. The first peripheral surface and the second peripheral surface may both be defined by the first length and the first thickness. The first housing body may include a third peripheral surface opposing a fourth peripheral surface. The third peripheral surface and the fourth peripheral surface may both be defined by the first width and the first thickness. The primary interface may be disposed on the first broad surface and/or the second broad surface. The touchscreen may be disposed on the first peripheral surface, the second peripheral surface, the third peripheral surface, and/or the fourth peripheral surface.

In some implementations, the second housing body may have a second length, a second width, and a second thickness. In some implementations, the second length may be greater than the second width. The second width may be greater than the second thickness.

In some implementations, the first length may be approximately equal to the second length. The first width may be approximately equal to the second width. In some implementations, the length, width, thickness, and/or other dimensions of the first housing body and the second housing body may be significantly different.

In some implementations, the second housing body may be movably coupled to the first housing body by way of a coupling mechanism. In some implementations, the coupling mechanism may include one or more of a hinge, a joint, a swivel, a sliding track, and/or other coupling mechanisms. The second housing body may be coupled to the first housing body such that the two housing bodies may be reconfigurable between an open configuration and a closed configuration.

In some implementations, the primary interface may be concealed in a closed configuration. As such, the user may access the primary interface with the device in an open configuration but not in a closed configuration, according to some implementations. In some implementations, additional touchscreens may be disposed on a fifth peripheral surface, a sixth peripheral surface, a seventh peripheral surface, and/or an eighth peripheral surface of the second housing body.

The primary interface may be configured to receive information from the user and provide information to the user. As such, the primary interface may include hardware and/or software to facilitate receiving information from the user and/or providing information to the user. In to some implementations, the primary interface may be accessible by the user with the device in an open configuration. In some implementations, the primary interface may be accessible by the user in a closed configuration. In some implementations, with the device in a closed configuration, all, some, or none of the primary interface may be accessible by a user, in various implementations.

The touchscreen may be configured to receive information from the user and/or provide information to the user. Graphics, text, and/or other visual content may be presented to the user via the touchscreen. According to some implementations, the touchscreen may be accessible by the user with the device in an open configuration and/or a closed configuration. With the device in a closed configuration, the touchscreen may be accessible without the primary interface being accessible.

The processor may be configured to provide information processing capabilities in the device. The processor may be configured to execute one or more computer program modules. The computer program modules may include one or more of a primary interface module, a touchscreen module, a configuration determination module, and/or other computer program modules.

The primary interface module may be configured to facilitate receiving and providing information via the primary interface. The primary interface module may be configured to facilitate receiving and providing information by providing a graphical user interface to the user via the primary interface. The primary interface module may be configured such that the graphical user interface presents graphical and/or textual information to the user. The primary interface module may be configured such that the graphical user interface receives information from, and/or presents information to the user that is related to the device, the user, and/or other information.

The touchscreen module may be configured to facilitate receiving and/or providing information via the touchscreen. The touchscreen module may be configured to facilitate receiving and/or providing information by providing a graphical user interface to the user via the touchscreen. The touchscreen module may be configured such that the graphical user interface presents graphical and/or textual information to the user. The touchscreen module may be configured such that the graphical user interface receives information from, and/or presents information to the user that is related to the device, the user, and/or other information.

In some implementations, the touchscreen module may be configured to coordinate operation of the touchscreen with the operation of the primary interface. In some implementations, coordinating operation of the touchscreen with the operation of the primary interface may include causing the touchscreen to provide the same information, different information, and/or a subset of the provided by primary interface 12 to the user.

The configuration determination module may be configured to determine whether the housing bodies are in an open configuration or a closed configuration. The configuration determination module may be configured to determine whether the housing bodies are in an open or closed configuration based on output signals from one or more configuration sensors and/or based on other information.

The Information collection systems may be configured to generate output signals conveying information related to use of the device by the user. Information related to the use of the device may include information related to one or more of a compressive force exerted on the device, a geo-location of the device, a motion of the device, an orientation of the device, a distance traveled by the device, sound recorded by the device, biometric information from the user, and/or other information. For example, the information collection systems may include one or more of a force sensor, a geo-location sensor, a motion sensor, biometric sensors, a pedometer, a microphone, a camera device, and/or other sensors.

These and other features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

DETAILED DESCRIPTION

Figure 1:
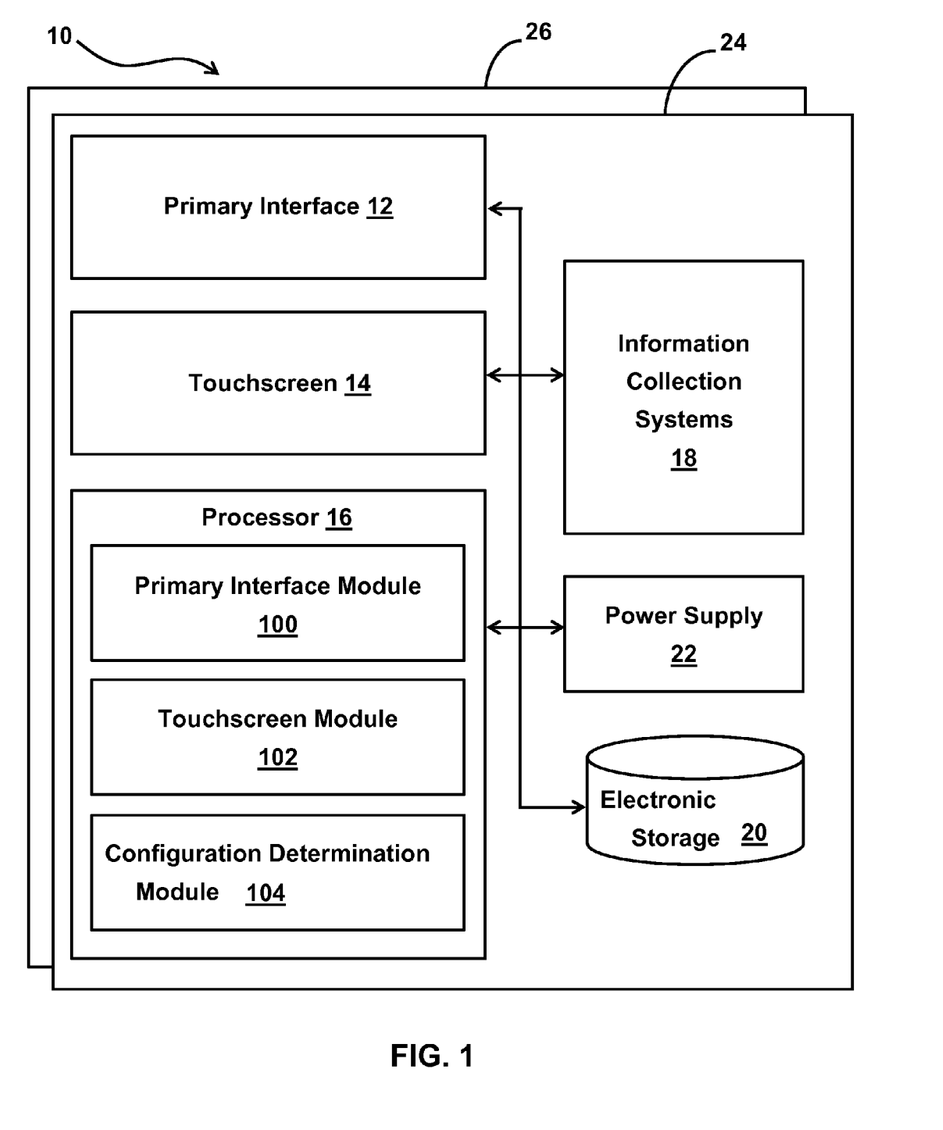
FIG. 1 illustrates a personal handheld electronic device, in accordance with one or more implementations.

FIG. 1 illustrates a personal handheld electronic device 10, in accordance with one or more implementations. In some implementations, device 10 may comprise one or more of a primary interface 12, a touchscreen 14, a processor 16, one or more information collection systems 18, electronic storage 20, a power supply 22, and/or other components. One or more components of device 10 may be disposed in and/or on a first housing body 24. In some implementations, one or more components of device 10 may be disposed in and/or on one or more housing bodies. In implementations having two housing bodies, first housing body 24 and a second housing body 26 may be movably coupled together by way of a coupling mechanism such that the two housing bodies are reconfigurable between an open configuration and a closed configuration, as described further herein.

Device 10 may be configured such that touchscreen 14 is disposed on a peripheral surface of first housing body 24 and/or second housing body 26. Touchscreen 14 being disposed on a peripheral surface may enable device 10 to receive information from a user and/or display information to the user when device 10 is in an open configuration and/or in a closed configuration. Touchscreen 14 being disposed on a peripheral surface may facilitate use of the non-peripheral surfaces and/or other surfaces of device 10 for other functionality. For example, device 10 may be configured to detect compressive forces generated by a user on first housing body 24 and/or second housing body 26 during exercise, and display information related to the detected forces via touchscreen 14 on a peripheral surface of system 10.

In some implementations, device 10 may include one or more components of the system described in patent application Ser. No. 13/527,465 filed Jun. 19, 2012, entitled "Personal Wellness Device"; U.S. Pat. No. 8,343,013, entitled "Personal Exercise Device"; and/or patent application Ser. No. 12/818,977 filed Jun. 18, 2010, entitled "Modular Exercise System; all of which are incorporated herein by reference. The description of device 10 and the examples presented herein related to exercise are not intended to be limiting. The features of device 10 may apply to any personal handheld electronic device.

As described above, touchscreen 14 may be disposed on a peripheral surface of first housing body 24 and/or second housing body 26. Generally, the implementations of device 10 may include one or two housing bodies: first housing body 24 and/or second housing body 26. First housing body 24 and/or second housing body 26 may be configured to house and/or carry one or more components of device 10. The components may include one or more of the components described in connection with FIG. 1. The one or more components may be disposed partially or wholly within a housing body, or be disposed on an external surface of a housing body.

In some implementations, first housing body 24 and second housing body 26 may be fully separated and/or docked together, either next to each other and/or one fully and/or partially enclosed into the other. In some implementations, fully separated may include first housing body 24 and second housing body 26 being physically distinct from each other. In some implementations, docked together may include mechanically and/or electrically coupling first housing body 24 with second housing body 26. For example, a surface of first housing body 24 may be mechanically coupled with a corresponding surface of second housing body 26. The surface of first housing body 24 may be mechanically coupled with the corresponding surface of second housing body 26 by one or more mechanical coupling mechanisms such as a hinge, a slide, a track, a pivot, a swivel, and/or other mechanical coupling mechanisms. As another example, first housing body 24 may be electrically coupled with second housing body 26 via one or more electrical coupling mechanisms such as wiring, a pin connector, a plug, a port (e.g., USB), and/or other electrical coupling mechanisms.

In such implementations, one housing body may include primary interface 12. The two separate housing bodies may communicate wirelessly with each other when separated. When docked, the two separate housing bodies may communicate wirelessly and/or via a docking port, which may also be used for charging one housing body from the other housing body.

Figure 2A:
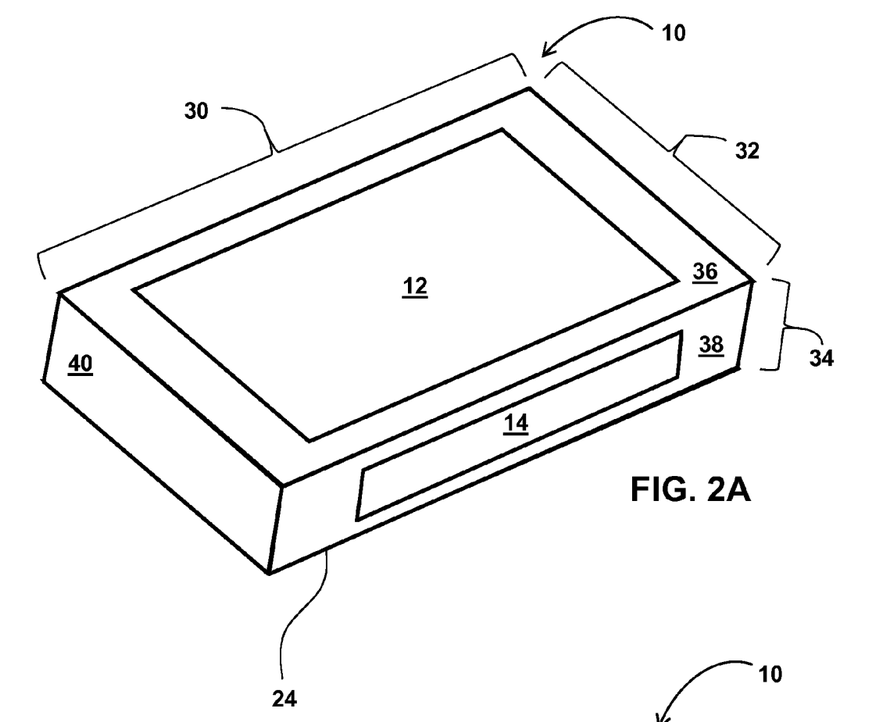
FIGS. 2A and 2B illustrate exemplary implementations of a personal handheld electronic device that include a single housing body with a touchscreen on a peripheral surface, in accordance with one or more implementations.
Figure 2B:
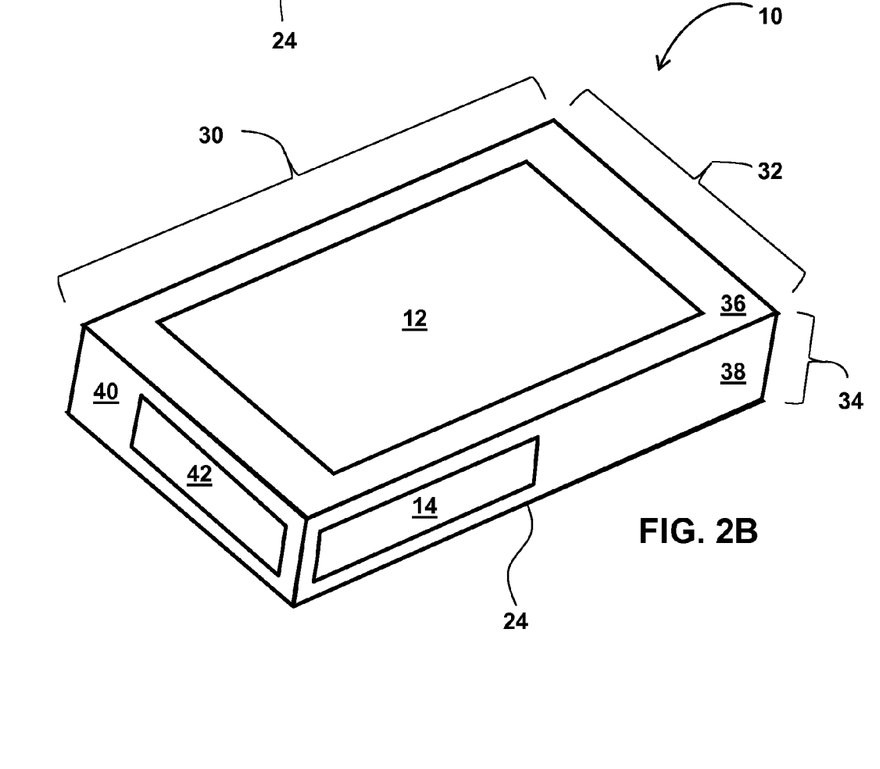

FIGS. 2A and 2B illustrate exemplary implementations of personal handheld electronic device 10 that include a single housing body (i.e., first housing body 24) with touchscreen 14 on a peripheral surface, in accordance with one or more implementations. First housing body 24 may have a first length 30, a first width 32, and a first thickness 34. In some implementations, first length 30 may be greater than first width 32. First width 32 may be greater than first thickness 34. The description of the relationship between first length 30, first width 32, and first thickness 34 is not intended to be limiting. First length 30, first width 32, and first thickness 34 may have any relationship such that first housing body 24 is generally shaped as a rectangular prism.

In some implementations, first housing body 24 may include a first broad surface 36 opposing a second broad surface (not visible in the view shown in FIG. 2A or 2B). First broad surface 36 and the second broad surface may both be defined by first length 30 and first width 32. First housing body 24 may include a first peripheral surface 38 opposing a second peripheral surface (not visible in the view shown in FIG. 2A or 2B). First peripheral surface 38 and the second peripheral surface may both be defined by first length 30 and first thickness 34. First housing body 24 may include a third peripheral surface 40 opposing a fourth peripheral surface (not visible in the view shown in FIG. 2A or 2B). Third peripheral surface 40 and the fourth peripheral surface may both be defined by first width 32 and first thickness 34. Primary interface 12 may be disposed on first broad surface 36 and/or the second broad surface. Touchscreen 14 may be disposed on first peripheral surface 38, the second peripheral surface, third peripheral surface 40, and/or the fourth peripheral surface. By way of non-limiting example, touchscreen 14 is shown in FIG. 2A as being disposed on first peripheral surface 38.

In some implementations, additional touchscreens may be disposed on first peripheral surface 38 (e.g., with touchscreen 14), the second peripheral surface, third peripheral surface 40, and/or the fourth peripheral surface. In the example shown in FIG. 2B, a touchscreen 42 is disposed on third peripheral surface 40. In some implementations, touchscreen 14 may be disposed on first peripheral surface 38 toward third peripheral surface 40 and touchscreen 42 may be disposed on third peripheral surface 40 toward first peripheral surface 38 such that touchscreen 14 and touchscreen 42 appear to merge or nearly merge to form a single touchscreen. In some implementations, multiple touchscreens may be disposed on the peripheral surfaces of device 10 such that the peripheral surfaces of device 10 appear to be a single continuous touchscreen.

FIGS. 3A, 3B, 3C, and 3D illustrate open and/or closed configurations of various exemplary implementations of personal handheld electronic device 10 that include two housing bodies (i.e., housing body 24 and housing body 26) with touchscreen 14 on a peripheral surface, in accordance with one or more implementations. Second housing body 26 may have a second length 44, a second width 46, and a second thickness 48 (shown in FIG. 3A and FIG. 4B). In some implementations, second length 44 may be greater than second width 46. Second width may be greater than second thickness 48. The description of the relationship between second length 44, second width 46, and second thickness 48 is not intended to be limiting. Second length 44, second width 46, and second thickness 48 may have any relationship such that second housing body 26 is generally shaped as a rectangular prism.

In some implementations, first length 30 may be approximately equal to second length 44. First width 32 may be approximately equal to second width 46. In some implementations, the length, width, thickness, and/or other dimensions of first housing body 24 and second housing body 26 may be significantly different. For example, second housing body 26 may form a lid and/or a flap disposed on first broad surface 36 of first housing body 24. In such implementations, second housing body 26 may be significantly thinner than first housing body 24.

Second housing body 26 may include a third broad surface 50 (shown in FIG. 3B) opposing a fourth broad surface 52 (shown in FIGS. 3A, 3B, 3C, and 3D). Third broad surface 50 and fourth broad surface 52 may both be defined by second length 44 and second width 46. Second housing body 26 may include a fifth peripheral surface 54 opposing a sixth peripheral surface (not visible in the views shown in FIGS. 3A-3D). Fifth peripheral surface 54 and the sixth peripheral surface may both be defined by second length 44 and second thickness 48. Second housing body 26 may include a seventh peripheral surface 56 opposing an eighth peripheral surface (not visible in the views shown in FIGS. 3A-3D). Seventh peripheral surface 56 and the eighth peripheral surface may both be defined by second width 46 and second thickness 48.

In some implementations, second housing body 26 may be movably coupled to first housing body 24 by way of a coupling mechanism. In some implementations, the coupling mechanism may include one or more of a hinge, a joint, a swivel, a sliding track, and/or other coupling mechanisms. Second housing body 26 may be coupled to first housing body 24 such that the two housing bodies may be reconfigurable between an open configuration and a closed configuration.

Figure 3A:
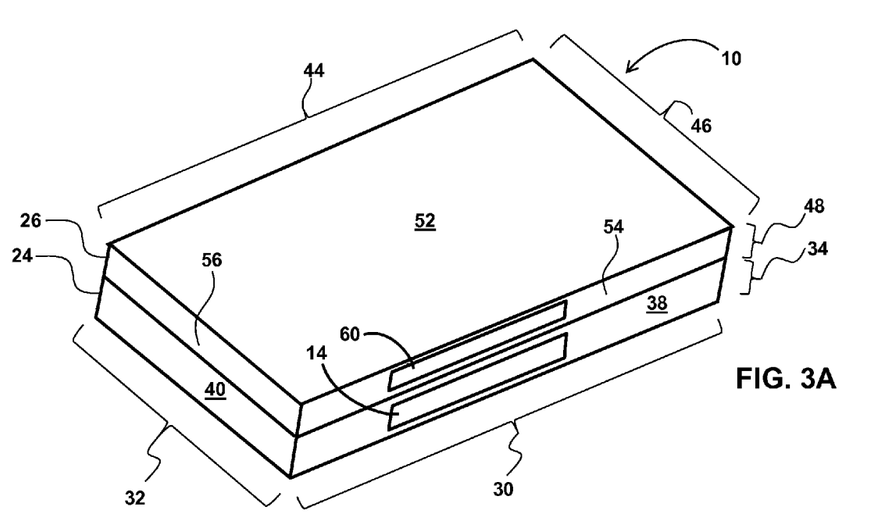
FIGS. 3A, 3B, 3C, and 3D illustrate open and/or closed configurations of various exemplary implementations of a personal handheld electronic device that include two housing bodies with a touchscreen on a peripheral surface, in accordance with one or more implementations.
Figure 3B:
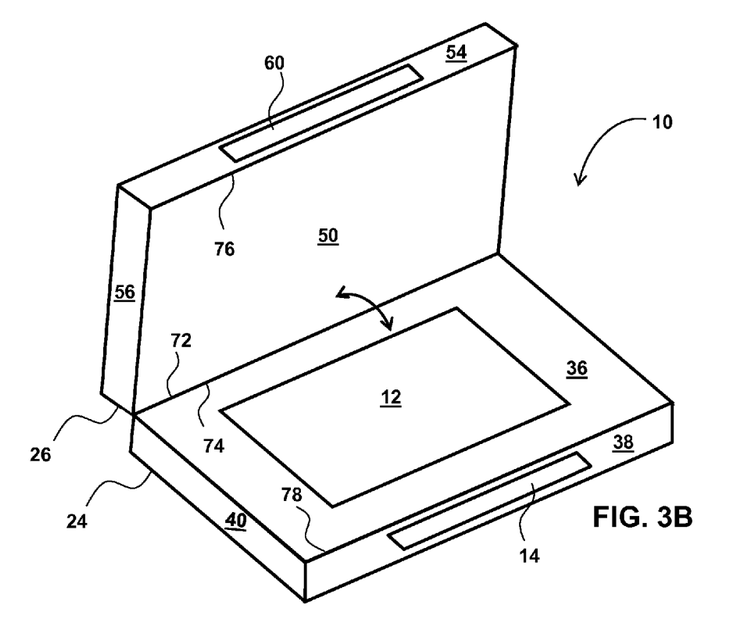
Figure 3C:
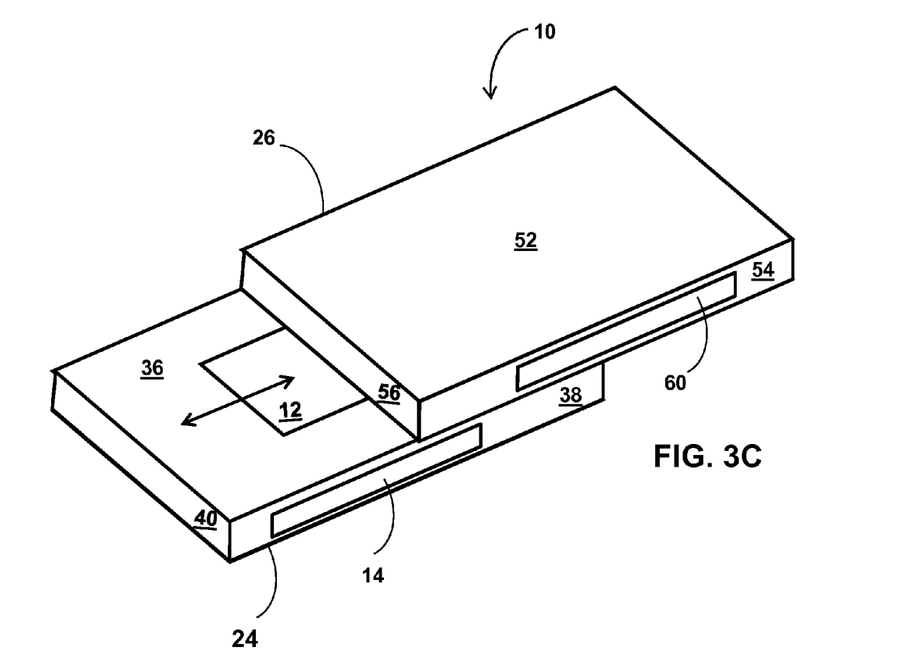
Figure 3D:
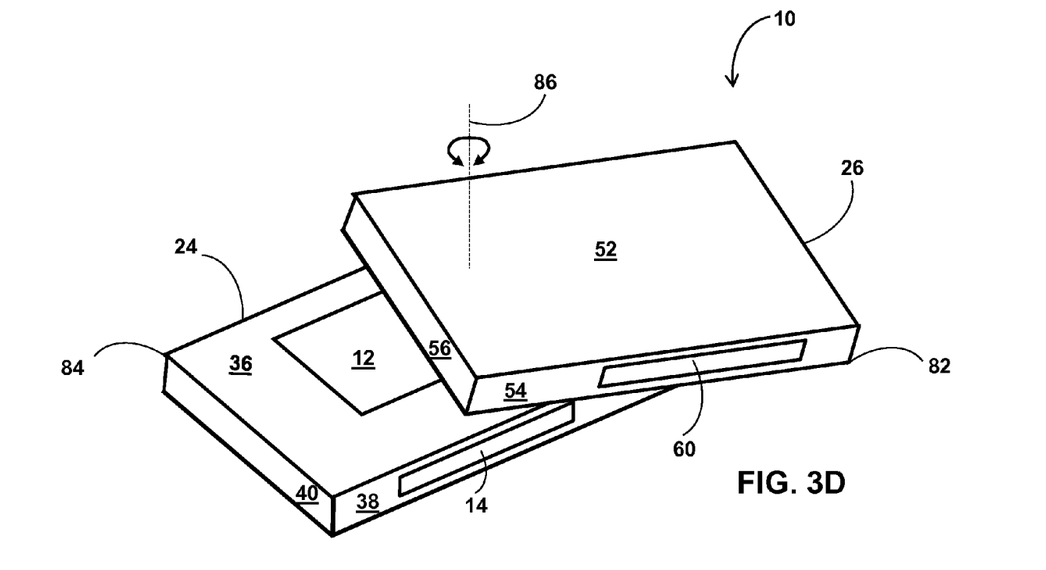

FIG. 3A illustrates an exemplary closed configuration while FIGS. 3B, 3C, and 3D illustrate exemplary open configurations of various implementations of device 10. First broad surface 36 or the second broad surface of first housing body 24 may be adjacent and/or approximately parallel to third broad surface 50 or the fourth broad surface of second housing body 26 with the two housing bodies in a closed configuration. In the example of a closed configuration shown in FIG. 3A, first broad surface 36 of first housing body 24 and third broad surface 50 of second housing body 26 may be concealed and/or inaccessible by a user in a closed configuration. In some implementations, primary interface 12 may be concealed in a closed configuration. As such, the user may access primary interface 12 with device 10 in an open configuration (see FIGS. 3B, 3C, and 3D) but not in a closed configuration, according to some implementations.

In some implementations, additional touchscreens may be disposed on fifth peripheral surface 54, the sixth peripheral surface, seventh peripheral surface 56, and/or the eighth peripheral surface. In the implementations shown in FIGS. 3A-3D, a third touchscreen 60 is disposed on fifth peripheral surface 54. In some implementations, touchscreen 14 may be disposed on first peripheral surface 38 and touchscreen 60 may disposed on fifth peripheral surface 54 such that touchscreen 14 is adjacent to third touchscreen 60 with the two housing bodies in a closed configuration.

In the implementation illustrated in FIG. 3B, first housing body 24 and second housing body 26 may be movably coupled together by way of a hinging coupling mechanism (not visible in FIG. 3B). The hinging coupling mechanism may be configured to movably couple a proximal edge 72 of third broad surface 50 with a proximal edge 74 of first broad surface 36. By way of non-limiting example, the hinging coupling mechanism may include a hinge, hinging mechanism, and/or other mechanism configured to movably couple first housing body 24 and second housing body 26. A distal edge 76 of third broad surface 50 may swing toward and/or away from a distal edge 78 of first broad surface 36 about an axis of rotation formed by the hinging coupling mechanism.

In the implementation illustrated in FIG. 3C, first housing body 24 and second housing body 26 may be movably coupled together by way of a sliding coupling mechanism (not visible in FIG. 3C). The sliding coupling mechanism may be configured to movably couple a portion of third broad surface 50 (not visible in FIG. 3C) with a portion of first broad surface 36. By way of non-limiting example, the sliding coupling mechanism may include a track, a slide, and/or other mechanism configured to provide linear translation between first housing body 24 and second housing body 26 while being movably coupled together. Seventh peripheral surface 56 may slide toward or away from third peripheral surface 40, as guided by the sliding coupling mechanism.

In the implementation illustrated in FIG. 3D, first housing body 24 and second housing body 26 may be movably coupled together by way of a pivot coupling mechanism (not visible in FIG. 3D). The pivot coupling mechanism may be configured to movably couple a portion of third broad surface 50 (not visible in FIG. 3D) with a portion of first broad surface 36 such that first housing body 24 and second housing body 26 may pivot or rotate relative to each other. By way of non-limiting example, the pivot coupling mechanism may include a pivot, swivel, joint, and/or other mechanism configured to provide rotation between first housing body 24 and second housing body 26 while being movably coupled together. A first corner 82 of second housing body 26 may rotate toward or away from a second corner 84 of first housing body 24 about an axis of rotation 86 formed by the pivot coupling mechanism.

Figure 4A:
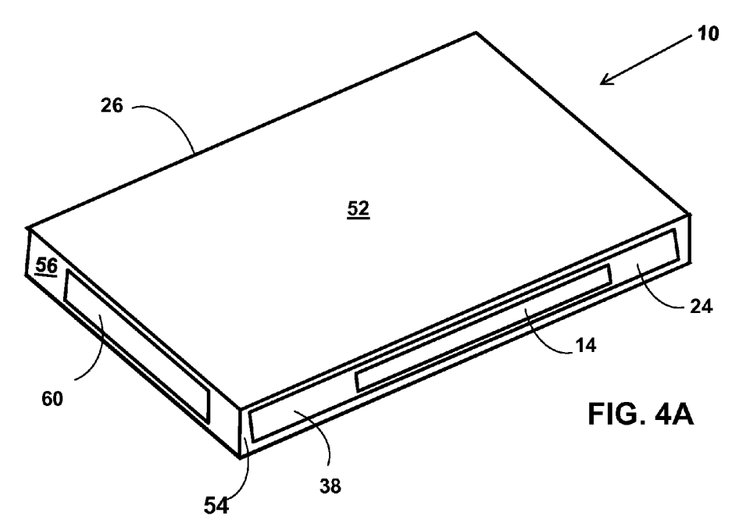
FIG. 4A illustrates an exemplary closed configuration of an implementation of a device having a first housing body and a second housing body movably coupled together by a sliding coupling mechanism, in accordance with one or more implementations.
Figure 4B:
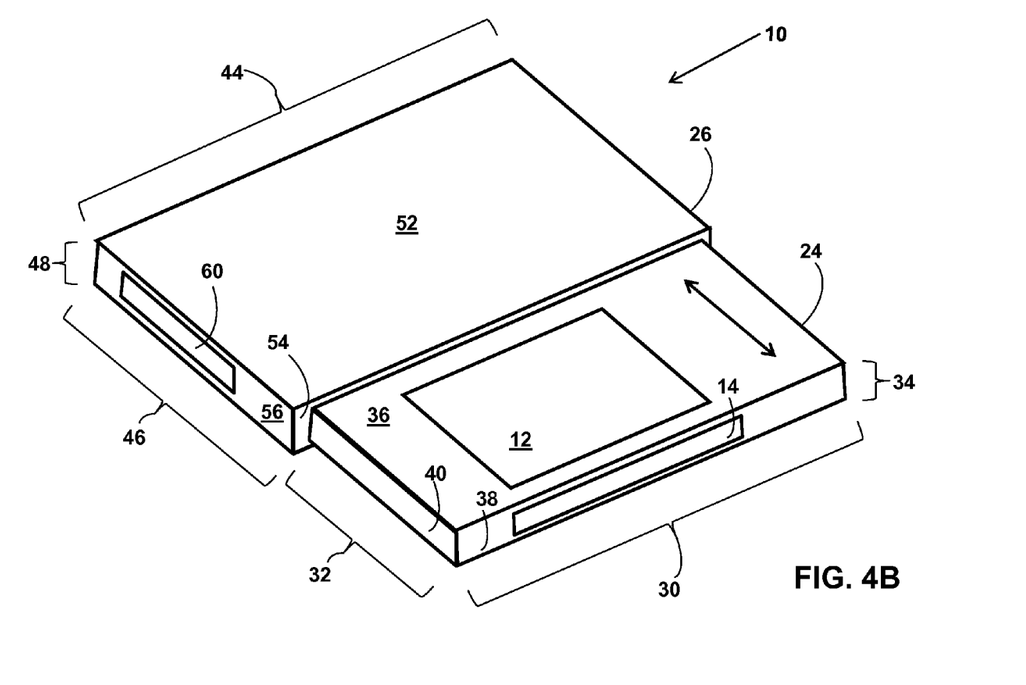
FIG. 4B illustrates an exemplary open configuration of an implementation of a device having a first housing body and a second housing body movably coupled together by a sliding coupling mechanism, in accordance with one or more implementations.

FIG. 4A illustrates an exemplary closed configuration of an implementation of device 10 having first housing body 24 and second housing body 26 movably coupled together by a sliding coupling mechanism (not visible in FIGS. 4A and 4B), in accordance with one or more implementations. FIG. 4B illustrates an exemplary open configuration of an implementation of device 10 having first housing body 24 and second housing body 26 movably coupled together by a sliding coupling mechanism (not visible in FIGS. 4A and 4B), in accordance with one or more implementations.

By way of non-limiting example, the sliding coupling mechanism may include a track, a slide, and/or other mechanism configured to provide linear translation between first housing body 24 and second housing body 26 while being movably coupled together. First peripheral surface 38 may slide toward or away from second housing body 26, as guided by the sliding coupling mechanism. In a closed configuration (see FIG. 4A), second housing body 26 may completely encase first housing body 24 except for first peripheral surface 38, which may remain exposed.

To enable second housing body 26 to encase first housing body 24 except for first peripheral surface 38, as in the implementations shown in FIGS. 4A and 4B, second length 44 may be longer than first length 30 (shown in FIG. 4B). Second width 46 may be wider than first width 32 (shown in FIG. 4B). Second thickness 48 may be thicker than first thickness 34 (shown in FIG. 4B). In some implementations, touchscreen 60 may be located on seventh peripheral surface 56.

One or more implementations of device 10 may be generally shaped as a rectangular prism in certain configurations. The first housing body 24 and/or second housing body 26—separately and/or combination—may be generally shaped as a rectangular prism. A rectangular prism describes a three-dimensional shape formed by six rectangular sides. Being generally shaped as a rectangular prism may describe a three-dimensional shape formed by six rectangular and/or near-rectangular sides with one or more of the sides having rounded and/or beveled corners, rounded and/or beveled edges, opposing surface that are not parallel, adjacent surfaces that are not orthogonal, and/or other geometric variances from a rectangular prism. For example, for the purposes of this disclosure, a housing body with an oval surface may be considered as being generally shaped as a rectangular prism.

Figure 5A:
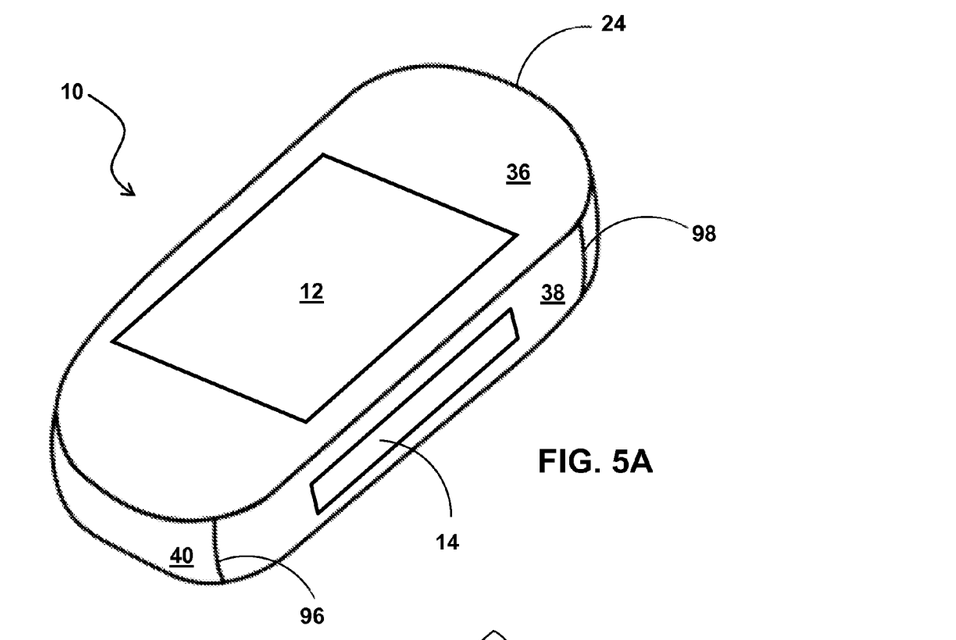
FIG. 5A illustrates an example of a first housing body generally shaped as a rectangular prism, in accordance with one or more implementations.

FIG. 5A illustrates an example of first housing body 24 generally shaped as a rectangular prism, in accordance with one or more implementations. In FIG. 5A, first broad surface 36 forms a generally ovular shape. Transitions 96, 98 between peripheral surfaces (e.g., first peripheral surface 38 and third peripheral surface 40) have an arcuate shape. In some implementations, first peripheral surface 38 and/or the other peripheral surfaces may have an arcuate shape.

Figure 5B:
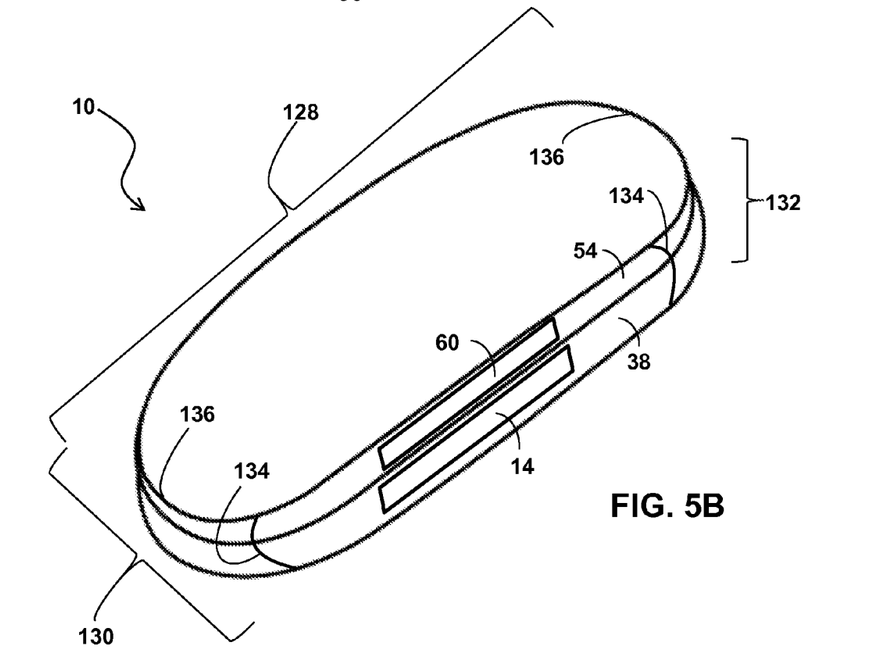
FIG. 5B illustrates a first and a second housing body in a closed configuration generally shaped as a rectangular prism, in accordance with one or more implementations.

FIG. 5B illustrates first and second housing bodies 24 and 26 in a closed configuration generally shaped as a rectangular prism, in accordance with one or more implementations. FIG. 5B illustrates first and second housing bodies 24 and 26 having rounded corners 134 and/or edges 136. A length 128, width 130, and/or thickness 132 of the closed configuration example of device 10 shown in FIG. 5B may vary by location on device 10. Length 128, width 130, and/or thickness 132 may vary by location because device 10 includes rounded corners 134 and/or edges 136. For example, the middle of device 10 may be thicker than the ends of device 10.

While several implementations of device 10 are described in connection with FIGS. 2A, 2B, 3A, 3B, 3C, 3D, 4A, 4B, 5A, and 5B, these are not intended to be limiting. Other implementations are contemplated and fall within the scope of the disclosure.

Returning to FIG. 1, primary interface 12 may be configured to receive information from the user and provide information to the user. As such, primary interface 12 may include hardware and/or software to facilitate receiving information from the user and/or providing information to the user. Primary interface 12 may include, for example, one or more input devices such as a touchscreen, a touch pad, a keypad, a switch, an analog stick, a button, a dial, a microphone, and/or other hardware configured to receive information from a user. Primary interface 12 may include for example, one or more output devices such as a display, a touchscreen, speakers, and/or other hardware configured to provide information to a user.

In to some implementations, primary interface 12 may be accessible by the user with device 10 in an open configuration, as described in connection with FIGS. 3A, 3B, 3C, 3D, 4A, 4B, and 5B. In some implementations, primary interface 12 may be accessible by the user in a closed configuration. In some implementations, with device 10 in a closed configuration, all, some, or none of primary interface 12 may be accessible by a user, in various implementations.

In some implementations, primary interface 12 may be configured to present user configurable settings to the user. Primary interface 12 may be configured to receive selections from the user of values for the user configurable settings. One or more user configurable settings may impact the current activity of one or more components of device 10. By way of non-limiting example, the user configurable settings may activate and/or deactivate touchscreen 14 in an open and/or closed configuration of device 10, and/or may visually arrange the location of information displayed by touchscreen 14. In some implementations, the user configurable settings may be related to information collection systems 18. For example, the user configurable settings may facilitate a display of information generated by information collection systems 18 on touchscreen 14 during exercise.

Touchscreen 14 may be configured to receive information from the user and/or provide information to the user. Graphics, text, and/or other visual content may be presented to the user via touchscreen 14. Touchscreen 14 may include an electronic display. Superimposed over some and/or all of the electronic display of touchscreen 14, touchscreen 14 may include one or more sensors configured to generate output signals that indicate a position of one or more objects that are in contact with and/or proximate to the surface of touchscreen 14. For example, the one or more touchscreen sensors may generate output signals that indicate the position of a finger of the user that is entering and/or selecting information via touchscreen 14. The sensors of touchscreen 14 may include one or more of a resistive, a capacitive, surface acoustic wave, and/or other sensors. In some implementations touchscreen 14 may comprise one or more of a glass panel, a conductive layer, a resistive layer, a scratch resistant layer, a layer that stores electrical charge, a transducer, a reflector, and/or other components.

According to some implementations, touchscreen 14 may be accessible by the user with device 10 in an open configuration and/or a closed configuration, as described in connection with FIGS. 3A, 3B, 3C, 3D, 4A, 4B, and 5B. With device 10 in a closed configuration, touchscreen 14 may be accessible without primary interface 12 being accessible.

In some implementations, touchscreen 14 may be configured to present user configurable settings to the user. Touchscreen may be configured to receive selections from the user of values for the user configurable settings. In some implementations, the user configurable settings and/or the values for the user configurable settings may be related to information collection systems 18. For example, the user configurable settings may facilitate a display of information generated by information collection systems 18 on touchscreen 14 during exercise.

Processor 16 may be disposed in first housing body 24 and/or second housing body 26 (shown in FIG. 3A-4B). Processor 16 may be configured to provide information processing capabilities in device 10. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination.

Processor 16 may be configured to execute one or more computer program modules. The computer program modules may include one or more of a primary interface module 100, a touchscreen module 102, a configuration determination module 104, and/or other computer program modules. Processor 16 may be configured to execute modules 100, 102, 104, and/or other modules by software; hardware; firmware; some combination of software, hardware, and/or firmware; and/or other mechanisms for configuring processing capabilities on processor 16.

It should be appreciated that although modules 100, 102, and 104 are illustrated in FIG. 1 as being co-located within a single processing unit, in implementations in which processor 16 includes multiple processing units, one or more of modules 100, 102, and/or 104 may be located remotely from the other modules. For example, one or more of modules 100, 102, 104, and/or other modules may be executed by an individual information collection system 18. The description of the functionality provided by the different modules 100, 102, and/or 104 described below is for illustrative purposes, and is not intended to be limiting, as any of modules 100, 102, and/or 104 may provide more or less functionality than is described. For example, one or more of modules 100, 102, and/or 104 may be eliminated, and some or all of its functionality may be provided by other ones of modules 100, 102, and/or 104. As another example, processor 16 may be configured to execute one or more additional modules that may perform some or all of the functionality attributed below to one of modules 100, 102, and/or 104.

Primary interface module 100 may be configured to facilitate receiving and providing information via primary interface 12. Primary interface module 100 may be configured to facilitate receiving and providing information by providing a graphical user interface to the user via primary interface 12. Primary interface module 100 may be configured such that the graphical user interface presents graphical and/or textual information to the user. Primary interface module 100 may be configured such that the graphical user interface receives information from, and/or presents information to the user that is related to device 10, the user, and/or other information.

Information related to device 10 may include, for example, user configurable settings related to the operation of device 10, information determined by processor 16, information generated via information collection systems 18, information stored in electronic storage 20, and/or other information. User configurable settings may include, for example, user display preferences that configure the information displayed by primary interface 12 and/or touchscreen 14. Information determined by processor 16 may include, for example, an indication of whether device 10 is in an open configuration or a closed configuration, the information displayed by touchscreen 14, and/or other information. Information generated via information collection systems 18 may include, for example, a current velocity of device 10 (e.g., miles per hour), a heart rate of the user, a location of device 10, and/or other information. Information stored in electronic storage 20 may include, for example, a previous exercise running route mileage traveled by device 10, a number of exercise sessions by the user in a given week, a maximum force ever exerted on device 10, and/or other information.

Information related to the user may include, for example, physical characteristics of the user, a visual representation of the user, textual information associated with the user, and/or other information. Physical characteristics of the user may include, for example, an age of the user, a gender of the user, a height of the user, a weight of the user, and/or other information. A visual representation of the user may include for example, a digital image of the user, an avatar that represents the user, a target body position of the user during exercise, and/or other information. Textual information associated with the user may include, for example, a textual listing of information determined by information collection systems 18, contact information (e.g., a phone number) associated with the user, information related to a social network associated with the user, exercise instructions being followed by the user, and/or other information.

Touchscreen module 102 may be configured to facilitate receiving and/or providing information via touchscreen 14, and/or other touchscreens in device 10. Touchscreen module 102 may be configured to facilitate receiving and/or providing information by providing a graphical user interface to the user via touchscreen 14. Touchscreen module 102 may be configured such that the graphical user interface presents graphical and/or textual information to the user. Touchscreen module 102 may be configured such that the graphical user interface receives information from, and/or presents information to the user that is related to device 10, the user, and/or other information.

Information related to device 10 may include, for example, user configurable settings related to the operation of device 10, information determined by processor 16, information generated via information collection systems 18, information stored in electronic storage 20, and/or other information. User configurable settings may include, for example, user display preferences that configure the information displayed by primary interface 12 and/or touchscreen 14. Information determined by processor 16 may include, for example, an indication of whether device 10 is in an open configuration or a closed configuration, the information displayed by primary interface 12, and/or other information. Information generated via information collection systems 18 may include, for example, a current velocity of device 10 (e.g., miles per hour), a heart rate of the user, a location of device 10, and/or other information. Information stored in electronic storage 20 may include, for example, a previous exercise running route mileage traveled by device 10, a number of exercise sessions by the user in a given week, a maximum force ever exerted on device 10, and/or other information.

Information related to the user may include, for example, physical characteristics of the user, a visual representation of the user, textual information associated with the user, and/or other information. Physical characteristics of the user may include, for example, an age of the user, a gender of the user, a height of the user, a weight of the user, and/or other information. A visual representation of the user may include for example, a digital image of the user, an avatar that represents the user, a target body position of the user during exercise, and/or other information. Textual information associated with the user may include, for example, a textual listing of information determined by information collection systems 18, contact information (e.g., a phone number) associated with the user, information related to a social network associated with the user, exercise instructions being followed by the user, and/or other information.

In some implementations, touchscreen module 102 may be configured to coordinate operation of touchscreen 14 with the operation of primary interface 12. In some implementations, coordinating operation of touchscreen 14 with the operation of primary interface 12 may include causing touchscreen 14 to provide the same information provided by primary interface 12 to the user. For example, during a current exercise session of the user, touchscreen module 102 may be configured such that primary interface 12 and touchscreen 14 both display a heart rate of the user, a route map, an exercise rate, and/or other information related to the current exercise session of the user. As another example, touchscreen module 102 may be configured such that primary interface 12 and touchscreen 14 both display a phone number and an email address of an associate of the user.

In some implementations, coordinating operation of touchscreen 14 with the operation of primary interface 12 may include causing the touchscreen 14 to provide different information than the information provided by primary interface 12 to the user. For example, touchscreen module 102 may be configured such that while primary interface module 100 causes primary interface 12 to display ten previous compressive force levels exerted on device 10, touchscreen 14 displays a current compressive force level exerted on device 10. As another example, touchscreen module 102 may be configured such that while primary interface 12 displays a photograph of an associate of the user, touchscreen 14 displays the phone number and email address of the associate.

In some implementations, coordinating operation of touchscreen 14 with operation of primary interface 12 may include causing touchscreen 14 to provide a subset of information provided by primary interface 12 to the user. For example, touchscreen module 102 may be configured such that while primary interface module 100 causes primary interface 12 to display a lap count, a speed, and a duration for a current exercise session, touchscreen 14 displays only the current lap count. As another example, touchscreen module 102 may be configured such that while primary interface 12 displays multiple phone numbers and email addresses of a group of associates of the user, touchscreen 14 displays the phone number and email address of only one selected associate from the group.

In implementations in which touchscreens in addition to touchscreen 14 are provided in the peripheral surfaces of device 10, touchscreen module 102 may be configured to facilitate coordination between primary interface 12 and the individual touchscreens, and between the individual touchscreens themselves, in a manner similar to the coordination described above. For example, touchscreen module 102 may cause touchscreen 14 located on first peripheral surface 38 to provide a subset of the information provided by primary interface 12. Touchscreen module 102 may cause second touchscreen 42 located on third peripheral surface 40 (shown in FIG. 2B) to provide the same information, different information, and/or a subset of the information provided by touchscreen 14.

Configuration determination module 104 may be configured to determine whether housing bodies 24 and 26 are in an open configuration or a closed configuration. Configuration determination module 104 may be configured to determine whether the housing bodies are in an open or closed configuration based on output signals from one or more configuration sensors and/or based on other information. The configuration sensors may be configured to generate output signals that convey information related to whether the two housing bodies are in an open configuration or a closed configuration. The configuration sensors may include mechanical sensors, proximity sensors, and/or other sensors. In some implementations, the configuration sensors may be included in the coupling mechanisms described above. The mechanical sensors may include sensors wherein electrical contacts couple and/or separate responsive to housing bodies 24 and 26 being in an open configuration and/or a closed configuration. Proximity sensors may include sensors configured to generate output signals conveying information that indicates whether device 10 is in an open configuration or a closed configuration without physical contact between components of the sensors. Such information may be generated via an electromagnetic field, infrared radiation, and/or other sources.

In some implementations, touchscreen module 102 may be configured to power touchscreen 14 and/or other touchscreens included in system 10 on and/or off based on the determination of whether the two housing bodies are in an open configuration or a closed configuration. In some implementations, touchscreen module 102 may be configured to cause the information provided via touchscreen 14 and/or other touchscreens included in system 10 to change based on the determination of whether the two housing bodies are in an open configuration or a closed configuration.

By way of a non-limiting example, touchscreen module 102 may be configured to facilitate receiving, via touchscreen 14, information including first information and second information. The first information may be receivable responsive to a determination by configuration determination module 104 that the two housing bodies are in an open configuration. The second information may be receivable responsive to a determination that the two housing bodies are in a closed configuration. For example, the first information may include user display preferences related to the presentation of information by primary interface 12 and/or touchscreen 14, notes typed on a keypad of touchscreen 14, a record of completed exercises, and/or other information. The second information may include, for example, a tap gesture that indicates a number of repetitions of a given exercise, information that locks and/or unlocks the information presented by touchscreen 14 such that the presented information remains displayed on touchscreen 14, information that selects presentation of current information related to a given information collection system 18 (e.g., a current heart rate), and/or other information.

Information collection systems 18 may be configured to generate output signals conveying information related to use of device 10 by the user. Information related to the use of device 10 may include information related to one or more of a compressive force exerted on the device, a geo-location of the device, a motion of the device, an orientation of the device, a distance traveled by the device, sound recorded by the device, biometric information from the user, and/or other information. For example, information collection systems 18 may include one or more of a force sensor, a geo-location sensor, a motion sensor, biometric sensors, a pedometer, a microphone, a camera device, and/or other sensors. One or more of the sensors may be housed by first housing body 24 and/or second housing body 26 (shown in FIG. 3A-5B).

The force sensor may be configured to generate a force output signal that conveys information related to compressive force exerted on device 10. Such information may include or be used to determine magnitude of the force, duration of the force, a force magnitude profile as a function of time, a quantity of compressive forces, and/or other information related to compressive force exerted on device 10. By way of non-limiting example, the force sensor may include a Flexi-Force A201 force sensor from Tekscan. However, other apparatus configured for force sensing are contemplated and within the scope of the disclosure.

The geo-location sensor may be configured to generate a location output signal conveying information related to a geo-location of device 10. The location output signal may be used to quantify one or more parameters of personal exercise, for example. Such parameters may include speed, distance traveled, course of travel, and/or other parameters related to a geo-location of device 10. By way of non-limiting example, the geo-location sensor may include a GPS device and/or other device configured to generate signals related to geo-location. However, other apparatus and techniques for location sensing and/or detecting are contemplated and within the scope of the disclosure.

The motion sensor may be configured to generate a motion output signal that conveys information related to a motion and/or orientation of device 10. The motion output signal may be used to quantify motions, changes in motion, orientation, changes in orientation, and/or information derived therefrom. By way of non-limiting example, the motion sensor may include an accelerometer configured to generate signals related to motion and/or orientation. However, other apparatus and techniques for motion and/or orientation sensing and/or detection are contemplated and within the scope of the disclosure.

The biometric sensors may be configured to generate biometric output signals conveying information related to biometric and/or physiological features of the user. The biometric sensors may include, for example, a heart rate sensor, a blood glucose monitor, and/or other biometric sensors. The biometric sensors may include sensors that generate output signals related to physiological characteristics associated with the shape of the body of the user. The biometric sensors may include sensors that generate output signals related to physiological characteristics such as particular geometries of a fingerprint, face, palm, hand, iris, retina, and/or other physiological characteristics. The heart rate sensors may utilize electrocardiography (ECG or EKG). The blood glucose monitor may be based on one or more non-invasive technologies including near IR detection, ultrasound, dielectric spectroscopy, and/or other non-invasive technologies for determining glucose concentration, in accordance with some implementations. The biometric sensors may include an image capture device, a biometric scanner, and/or other devices configured to observe biometric features.

The pedometer may be configured to generate a step output signal that conveys information related to steps taken by a user carrying device 10. The step output signal may be used to determine a number of steps taken, a distance traveled, and/or other information related to or derived from steps taken by the user.

The microphone may be configured to receive sound from a user and generate an output signal that represents the received sound. The received sound may include, for example, a verbal repetition count associated with an exercise performed by the user, verbal control inputs from the user, and/or other sound.

The camera device may be configured to capture visual data. The visual data may include still images, video, and/or other visual data. In some implementations, the camera device may be utilized as the biometric sensor. The camera device may include, by way of non-limiting example, a digital camera and/or other imaging devices.

In some implementations, touchscreen module 102 may be configured to cause touchscreen 14 to provide information to the user based on the information conveyed by the output signals generated by information collection systems 18. For example, touchscreen module 102 may be configured to cause touchscreen 14 to display the heart rate of the user, a distance traveled by the user during exercise, an amount of force exerted on device 10 by the user, and/or other information.

In some implementations, touchscreen module 102 may be configured to coordinate operation of touchscreen 14 with the operation of primary interface 12 and/or other touchscreens provided in device 10 based on one or both of user preferences or information related to use of the device by the user conveyed by the output signals of information collection systems 18. For example, primary interface module 100 and/or touchscreen module 102 may be configured such that the user may enter and/or select information via primary interface 12 and/or touchscreen 14 that indicates the user prefers touchscreen 14 to present a subset of the information presented by primary interface 12 during an exercise session. Touchscreen module 102 may be configured such that while primary interface module 100 causes a running route map to be displayed on primary interface 12 during the exercise session, touchscreen module 102 causes a current mileage to be displayed on touchscreen 14. The current mileage being the distance the user has traveled during the exercise session.

Electronic storage 20 may be configured to electronically store information. Electronic storage 20 may be disposed in first housing body 24 (shown in FIGS. 2A-5B) and/or second housing body 26 (shown in FIG. 3A-5B). In some implementations, touchscreen module 102 may be configured to cause touchscreen 14 to provide the electronically stored information to the user. Electronic storage 20 may comprise electronic storage media that electronically stores information. Such electronic storage media may include one or both of system storage that is provided integrally (i.e., substantially non-removable) with device 10 or removable storage that is removably connectable to device 10 via, for example, a port (e.g., a USB port, a firewire port, etc.) or a drive (e.g., a disk drive, etc.). Electronic storage 20 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 20 may include one or more virtual storage resources (e.g., cloud storage, a virtual private network, and/or other virtual storage resources). Electronic storage 20 may store software algorithms; information determined by one or more processors (e.g., processor 16), and/or other information that enables device 10 to function as described herein.

Power supply 22 may be configured to portably supply electrical power to one or more components of device 10. By way of non-limiting example, power supply 22 may include one or more of a battery, a capacitor, apparatus for receiving electrical power from an external source (e.g., a wall socket), and/or other power supplies. In some implementations, power supply 22 may be rechargeable. In some implementations, device 10 may receive power via a USB port and/or other wired communications port that may be part of electronic storage 20.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A personal handheld electronic device, the device comprising:
    a first housing body generally shaped as a rectangular prism such that the first housing body has a first length, a first width, and a first thickness, the first length being greater than the first width and the first width being greater than the first thickness, wherein the first housing body includes:
        a first broad surface opposing a second broad surface, both being defined by the first length and the first width;
        a first peripheral surface opposing a second peripheral surface, both being defined by the first length and the first thickness; and
        a third peripheral surface opposing a fourth peripheral surface, both being defined by the first width and the first thickness,
    a primary interface disposed on the first broad surface, the primary interface being configured to receive information from a user and provide information to the user;
    a first touchscreen disposed on the first peripheral surface, the first touchscreen being configured to receive information from the user and provide information to the user, the information provided to the user by the first touchscreen being visually represented as text and/or graphics; and
    one or more physical processors configured by machine-readable instructions to:
        facilitate receiving and providing information via the primary interface; and
        facilitate receiving information from the user and providing information to the user via the first touchscreen, the information provided to the user by the first touchscreen being visually represented as text and/or graphics; and
    a second housing body generally shaped as a rectangular prism such that the second housing body has a second length, a second width, and a second thickness, the second length being greater than the second width and the second width being greater than the second thickness, wherein the second housing body includes:
        a third broad surface opposing a fourth broad surface, both being defined by the second length and the second width;
        a fifth peripheral surface opposing a sixth peripheral surface, both being defined by the second length and the second thickness; and
        a seventh peripheral surface opposing an eighth peripheral surface, both being defined by the second width and the second thickness;
        a second touchscreen disposed on the fifth peripheral surface, the second touchscreen being configured to receive information from the user and provide information to the user, the information provided to the user by the second touchscreen being visually represented as text and/or graphics;
    wherein the first touchscreen adjacent to the second touchscreen with the two housing bodies in the closed configuration, and wherein, responsive to the first touchscreen being adjacent to the second touchscreen with the two housing bodies in the closed configuration, the first touchscreen and the second touchscreen appear to merge or nearly merge to form a single continuous display.

2. The device of claim 1, wherein the one or more physical processors are further configured by machine-readable instructions to coordinate operation of the first touchscreen with operation of the primary interface.

3. The device of claim 2, wherein the one or more physical processors are further configured by machine-readable instructions to coordinate operation of the first touchscreen with operation of the primary interface based on one or both of user preferences or information related to use of the device by the user.

4. The device of claim 3, wherein information related to the use of the device includes information related to one or more of a compressive force exerted on the device, a geo-location of the device, a motion of the device, an orientation of the device, a distance traveled by the device, sound recorded by the device, or biometric information from the user.

5. The device of claim 2, wherein coordinating operation of the first touchscreen with operation of the primary interface includes causing the first touchscreen to provide the same information provided by the primary interface to the user.

6. The device of claim 2, wherein coordinating operation of the first touchscreen with operation of the primary interface includes causing the first touchscreen to provide different information than the information provided by the primary interface to the user.

7. The device of claim 2, wherein coordinating operation of the first touchscreen with operation of the primary interface includes causing the first touchscreen to provide a subset of information provided by the primary interface to the user.

8. The device of claim 1, wherein the first length approximately equals the second length and the first Width approximately equals the second width.

9. The device of claim 1, wherein the second housing body is movably coupled to the first housing body by way of a coupling mechanism such that the two housing bodies are reconfigurable between an open configuration and a closed configuration, the first broad surface or the second broad surface of the first housing body being adjacent and approximately parallel to the third broad surface or the fourth broad surface of the second housing body with the two housing bodies in the closed configuration.

10. The device of claim 9, wherein the coupling mechanism includes one or more of a hinge, a joint, a swivel, or a sliding track.

11. The device of claim 9, wherein the one or more physical processors are further configured by machine-readable instructions to determine whether the two housing bodies are in the open configuration or the closed configuration.

12. The device of claim 11, wherein the one or more physical processors are further configured by machine-readable instructions to power the first touchscreen on and/or off based on the determination of whether the two housing bodies are in the open configuration or the closed configuration.

13. The device of claim 11, wherein the one or more physical processors are further configured by machine-readable instructions to cause the information provided via the first touchscreen to change based on the determination of whether the two housing bodies are in the open configuration or the closed configuration.

14. The device of claim 11, wherein the one or more physical processors are further configured by machine-readable instructions to facilitate receiving, via the first touchscreen, information including first information and second information, the first information being receivable responsive to a determination that the two housing bodies are in the open configuration, the second information being receivable responsive to a determination that the two housing bodies are in the closed configuration.

15. The device of claim 1, further comprising one or more information collection systems, the one or more information collection systems being configured to generate output signals conveying information related to use of the device by the user, wherein information related to the use of the device includes information related to one or more of a compressive force exerted on the device, a geo-location of the device, a motion of the device, an orientation of the device, a distance traveled by the device, sound recorded by the device, or biometric information from the user.

16. The device of claim 15, wherein the one or more physical processors are further configured by machine-readable instructions to cause the first touchscreen to provide information to the user based on the information conveyed by the output signals.

17. The device of claim 1, wherein the one or more physical processors are further configured by machine-readable instructions to coordinate operation of the first touchscreen with operation of the second touchscreen to receive information from the user and provide information to the user, the information provided to the user by the first touchscreen and the second touchscreen being visually represented as text and/or graphics, the one or more physical processors configured such that coordinating operation of the first touchscreen and the second touch screen includes one or more of:
 causing the first touchscreen to provide the same information provided by the second touchscreen;
 causing the first touchscreen to provide different information than the information provided by the second touchscreen; or
 causing the first touchscreen to provide a subset of information provided by the second touchscreen.

18. The device of claim 1, wherein the first housing body and the second housing body are movably coupled by way of a pivot coupling mechanism, the pivot coupling mechanism configured to movably couple a portion of the third broad surface with a portion of the first broad surface such that a first corner of the second housing body rotates toward or away from a second corner of the first housing body about an axis of rotation formed by the pivot coupling mechanism.

19. The device of claim 1, wherein the second length is longer than the first length, the second width is wider than the first width, and the second thickness is thicker than first thickness,
 wherein the first housing body and the second housing body are movably coupled by a sliding coupling mechanism, the sliding coupling mechanism configured to provide linear translation of the first housing body relative to the second housing body between an open configuration and a closed configuration such that the first peripheral surface slides toward or away from the second housing body, and
 wherein, in the closed configuration, the second housing body encases the first housing body except for the first peripheral surface.

* * * * *